United States Patent
Wu (10) Patent No.: US 10,764,785 B2
(45) Date of Patent: Sep. 1, 2020

(54) DEVICE AND METHOD OF HANDLING NETWORK SLICE INFORMATION

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/912,484

(22) Filed: Mar. 5, 2018

(65) Prior Publication Data

US 2018/0262954 A1    Sep. 13, 2018

Related U.S. Application Data

(60) Provisional application No. 62/468,322, filed on Mar. 7, 2017.

(51) Int. Cl.
*H04W 28/16*    (2009.01)
*H04W 76/16*    (2018.01)
(Continued)

(52) U.S. Cl.
CPC .......... *H04W 28/16* (2013.01); *H04L 63/1416* (2013.01); *H04L 63/1425* (2013.01);
(Continued)

(58) Field of Classification Search
CPC . H04L 41/0806; H04L 41/0893; H04L 41/12; H04L 41/5003; H04L 63/1416;
(Continued)

(56) References Cited

U.S. PATENT DOCUMENTS 10,129,802 B2 * 11/2018 Pelletier ............... H04W 76/27
2007/0259675 A1 * 11/2007 Worrall ................ H04W 68/00
                                                                        455/458
(Continued)

FOREIGN PATENT DOCUMENTS

CN    102761952 A    10/2012
CN    103858512 A    6/2014
(Continued)

OTHER PUBLICATIONS

Ericsson, Signalling aspects of network slicing, Nov. 18, 2016, 3GPP TSG-RAN WG2 #96, Tdoc R2-168708 (Year: 2016).*
(Continued)

*Primary Examiner* — Eric Nowlin
(74) *Attorney, Agent, or Firm* — Winston Hsu (57) ABSTRACT

A communication device for handling network slice information comprises a storage device for storing instructions and a processing circuit coupled to the storage device. The storage device stores, and the processing circuit is configured to execute instructions of entering a RRC_CONNECTED state and establishing a RRC connection to a network; receiving a first RRC message on the RRC connection from the network, wherein the first RRC message suspends the RRC connection or configures the communication device to enter a RRC_INACTIVE state; performing a RRC procedure with the network to resume the RRC connection or transferring to the RRC_CONNECTED state from the RRC_INACTIVE state; and transmitting a second RRC message of the RRC procedure to the network, wherein the second RRC message comprises network slice information.

12 Claims, 7 Drawing Sheets

(51) Int. Cl.

| | |
|---|---|
| H04L 29/06 | (2006.01) |
| H04L 29/08 | (2006.01) |
| H04W 76/12 | (2018.01) |
| H04W 36/00 | (2009.01) |
| H04W 76/15 | (2018.01) |
| H04W 76/27 | (2018.01) |
| H04W 76/10 | (2018.01) |
| H04W 76/18 | (2018.01) |
| H04W 36/28 | (2009.01) |
| H04W 76/19 | (2018.01) |

(52) U.S. Cl.
CPC .......... *H04L 63/1441* (2013.01); *H04L 67/12* (2013.01); *H04L 69/22* (2013.01); *H04W 36/0027* (2013.01); *H04W 76/10* (2018.02); *H04W 76/12* (2018.02); *H04W 76/15* (2018.02); *H04W 76/16* (2018.02); *H04W 76/27* (2018.02); *H04W 36/0055* (2013.01); *H04W 36/0066* (2013.01); *H04W 36/28* (2013.01); *H04W 76/18* (2018.02); *H04W 76/19* (2018.02)

(58) Field of Classification Search
CPC . H04L 63/1425; H04L 63/1441; H04L 67/12; H04L 69/22; H04W 12/06; H04W 36/0027; H04W 36/0055; H04W 36/0066; H04W 36/28; H04W 48/18; H04W 76/10; H04W 76/12; H04W 76/15; H04W 76/16; H04W 76/18; H04W 76/19; H04W 76/27; H04W 84/042
See application file for complete search history.

(56) References Cited

U.S. PATENT DOCUMENTS

| | | | |
|---|---|---|---|
| 2013/0260811 A1 | 10/2013 | Rayavarapu | |
| 2014/0031069 A1* | 1/2014 | Yang .................. | H04W 68/00 455/458 |
| 2014/0321371 A1* | 10/2014 | Anderson ............ | H04W 76/38 370/329 |
| 2015/0092630 A1 | 4/2015 | Lin | |
| 2016/0234877 A1* | 8/2016 | Bangolae ............ | H04W 4/70 |
| 2017/0339609 A1* | 11/2017 | Youn ................... | H04W 76/11 |
| 2018/0077681 A1* | 3/2018 | Leroux ............... | H04W 4/14 |
| 2018/0206080 A1* | 7/2018 | Chen .................. | H04W 4/06 |
| 2018/0249441 A1* | 8/2018 | Ryoo ................... | H04J 11/00 |
| 2018/0310321 A1* | 10/2018 | Basu Mallick ..... | H04W 72/085 |
| 2018/0317163 A1* | 11/2018 | Lee .................... | H04W 48/18 |
| 2018/0324577 A1* | 11/2018 | Faccin ................ | H04W 8/06 |
| 2018/0324751 A1* | 11/2018 | Hampel ............... | H04W 68/02 |
| 2018/0324877 A1* | 11/2018 | Tiwari ................ | H04L 63/108 |
| 2018/0332523 A1* | 11/2018 | Faccin ................ | H04W 36/14 |
| 2018/0352592 A1* | 12/2018 | Zhu .................... | H04W 8/24 |
| 2018/0367980 A1* | 12/2018 | Lee .................... | H04W 8/08 |
| 2018/0368039 A1* | 12/2018 | Wu .................... | H04W 36/0033 |
| 2018/0368061 A1* | 12/2018 | Yu ...................... | H04W 8/005 |
| 2018/0376445 A1* | 12/2018 | Yoon .................. | H04W 8/20 |
| 2019/0007921 A1* | 1/2019 | Schliwa-Bertling ........................ | H04W 60/00 |
| 2019/0014492 A1* | 1/2019 | Kim .................... | H04W 68/02 |
| 2019/0014515 A1* | 1/2019 | Zee ..................... | H04W 36/08 |
| 2019/0021043 A1* | 1/2019 | Youn .................. | H04W 48/16 |
| 2019/0021047 A1* | 1/2019 | Zong .................. | H04W 76/11 |
| 2019/0026094 A1* | 1/2019 | Stammers ............ | H04W 4/80 |
| 2019/0028941 A1* | 1/2019 | Zee ..................... | H04W 36/0077 |
| 2019/0029000 A1* | 1/2019 | Vikberg .............. | H04W 48/18 |
| 2019/0029065 A1* | 1/2019 | Park .................... | H04W 60/06 |
| 2019/0037409 A1* | 1/2019 | Wang .................. | H04W 16/04 |
| 2019/0045351 A1* | 2/2019 | Zee ..................... | H04W 76/11 |
| 2019/0082490 A1* | 3/2019 | Zhang ................. | H04W 76/20 |
| 2019/0342804 A1* | 11/2019 | Futaki ................ | H04W 36/0069 |
| 2019/0350035 A1* | 11/2019 | Kim .................... | H04W 76/27 |
| 2019/0373520 A1* | 12/2019 | Sillanpaa ............ | H04W 48/18 |

FOREIGN PATENT DOCUMENTS

| | | | |
|---|---|---|---|
| CN | 105472763 A | 4/2016 | |
| CN | 105898894 A | 8/2016 | |
| GB | 2569989 A * | 7/2019 | |
| WO | 2015/035591 A1 | 3/2015 | |
| WO | 2016/162502 A1 | 10/2016 | |
| WO | WO-2018171470 A1 * | 9/2018 | |
| WO | WO-2018176482 A1 * | 10/2018 | ............ H04W 74/00 |

OTHER PUBLICATIONS

Huawei et al., RRC Support for Network Slicing, Jan. 19, 2017, 3GPP TSG-RAN WG2 NR Ad Hoc, R2-1700100 (Year: 2017).*
Huawei et al., Slice Availability and Discovery in RAN, Jan. 19, 2017, 3GPP TSG-RAN WG2 NR Ad Hoc, R2-1700102 (Year: 2017).*
Coolpad, Discussion on UE RRC modeling to support multiple slices, Jan. 19, 2017, 3GPP TSG-RAN WG2 NR Ad Hoc, R2-1700314 (Year: 2017).*
Ericsson, Signalling aspects of network slicing, Feb. 17, 2017, 3GPP TSG-RAN WG2 #97, R2-1701051 (Year: 2017).*
Huawei et al., RRC Support for Network Slicing, Feb. 17, 2017, 3GPP TSG-RAN WG2#97, R2-1701216 (Year: 2017).*
Huawei et al., Radio Resource Management for Network Slicing, Feb. 17, 2017, 3GPP TSG-RAN WG2#97, R2-1701217 (Year: 2017).*
Huawei et al., Slice Availability and Discovery in RAN, Feb. 17, 2017, 3GPP TSG-RAN WG2#97, R2-1701218 (Year: 2017).*
Coolpad, Discussion on UE RRC modeling to support multiple slices per-UE, Feb. 18, 2017, 3GPP TSG-RAN WG2 Meeting #97, R2-1701262 (Year: 2017).*
Sony, Mobility and RAN slicing, Feb. 17, 2017, 3GPP TSG RAN WG2 Meeting #97, R2-1701510 (Year: 2017).*
Intel, Further considerations on Slice-specific Access/Congestion Control and Mobility, Feb. 17, 2017, 3GPP TSG RAN WG2 Meeting #97, R2-1701739 (Year: 2017).*
Huwawei et al, Network Slice Selection Assistance Information over RRC, May 19, 2017, 3GPP TSG-RAN WG2 Meeting #98, R2-1705008 (Year: 2017).*
Nokia et al., Slice assistance Information over RRC, Jun. 29, 2017, 3GPP TSG-RAN WG2 NR Adhoc #2, R2-1706984 (Year: 2017).*
Ericsson, Assistance information for network slice selection in RRC, Jun. 29, 2017, 3GPP TSG-RAN WG3 AH #2, Tdoc R3-172509 (Year: 2017).*
Ericsson, TP for Assistance information for network slice selection in RRC, Jun. 29, 2017, 3GPP TSG-RAN WG3 AH #2, Tdoc R3-172556 (Year: 2017).*
3GPP TS 23.501 V0.3.1, Mar. 2017.
Search Report dated Jul. 23, 2018 for EP application No. 18160383. 8, pp. 1-5.
3GPP TS 23.501 V0.3.1 (Mar. 2017), "3rd Generation Partnership Project; Technical Specification Group Services and System Aspects; System Architecture for the 5G System; Stage 2(Release 15)", XP051290363, pp. 1-97.
3rd Generation Partnership Project;Technical Specification Group Radio Access Network; Study on New Radio Access Technology; Radio Access Architecture and Interfaces, Release 14, 3GPP TR 38.801 V2.0.0 (Mar. 2017).
Office action dated Nov. 8, 2018 for the Taiwan application No. 107107424, filing date Mar. 6, 2018, pp. 1-12.
Office action dated Dec. 12, 2019 for the China application No. 201810188766.5, filing date Mar. 7, 2018, p. 1-10.
Ericsson, "Signalling aspects of network slicing", pp. 1-4, 3GPP TSG-RAN WG2 #96, Reno, Nevada, USA, Nov. 14-18, 2016, Tdoc R2-168708.
Office action dated Jun. 30, 2020 for the China application No. 201810188766.5 filing date Mar. 7, 2018, p. 1-6.

* cited by examiner

DEVICE AND METHOD OF HANDLING NETWORK SLICE INFORMATION

CROSS REFERENCE TO RELATED APPLICATIONS

This application claims the benefit of U.S. Provisional application Ser. No. 62/468,322, filed on Mar. 7, 2017, which is incorporated herein by reference.

BACKGROUND OF THE INVENTION

1. Field of the Invention

The present invention relates to a device and a method used in a wireless communication system, and more particularly, to a device and a method of handling network slice information.

2. Description of the Prior Art

A long-term evolution (LTE) system provides high data rate, low latency, packet optimization, and improved system capacity and coverage. In the LTE system, a radio access network known as an evolved universal terrestrial radio access network (E-UTRAN) includes at least one evolved Node-B (eNB) for communicating with at least one user equipment (UE), and for communicating with a core network including a mobility management entity (MME), a serving gateway, etc., for Non-Access Stratum (NAS) control.

SUMMARY OF THE INVENTION

The present invention therefore provides a communication device and method for handling network slice information to solve the abovementioned problem.

A communication device for handling network slice information comprises a storage device for storing instructions and a processing circuit coupled to the storage device. The storage device stores, and the processing circuit is configured to execute instructions of entering a RRC_CONNECTED state and establishing a radio resource control (RRC) connection to a network; receiving a first RRC message on the RRC connection from the network, wherein the first RRC message suspends the RRC connection or configures the communication device to enter a RRC_INACTIVE state; performing a RRC procedure with the network to resume the RRC connection or transferring to the RRC_CONNECTED state from the RRC_INACTIVE state; and transmitting a second RRC message of the RRC procedure to the network, wherein the second RRC message comprises network slice information.

A network for handling network slice information comprises a storage device for storing instructions and a processing circuit coupled to the storage device. The storage device stores, and the processing circuit is configured to execute instructions of establishing a RRC connection to a communication device; transmitting a first RRC message on a RRC connection to the communication device, wherein the first RRC message suspends the RRC connection or configures the communication device to enter a RRC_INACTIVE state; performing a RRC procedure with the communication device to resume the RRC connection; and receiving a second RRC message of the RRC procedure from the communication device, wherein the second RRC message comprises network slice information.

A network for handling network slice information comprises a storage device for storing instructions and a processing circuit coupled to the storage device. The storage device stores, and the processing circuit is configured to execute instructions of transmitting a paging message which comprises first network slice information, a protocol data unit (PDU) Session identity (ID) or application information, to a communication device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
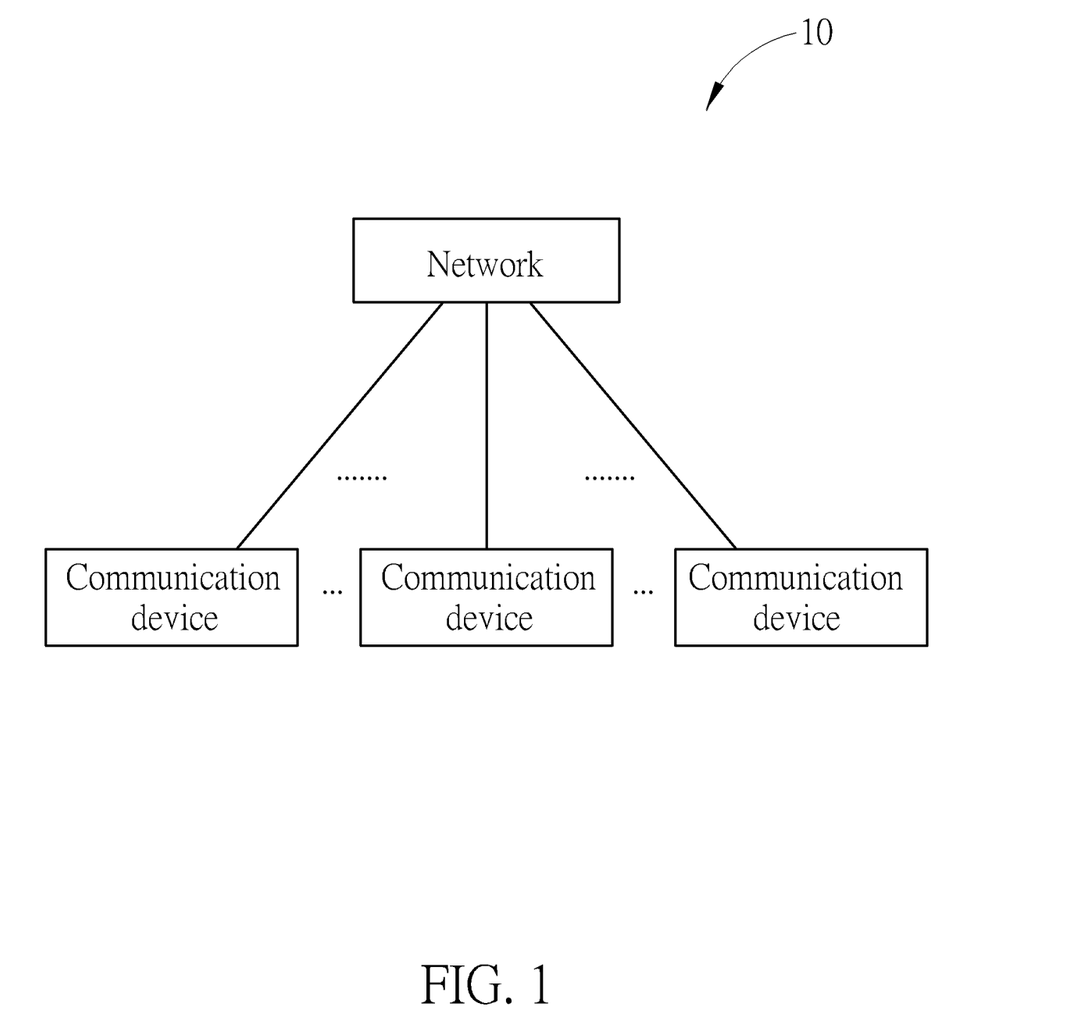
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and the communication device may communicate with each other via one or multiple cells (e.g., one or multiple carriers) belonging to one or multiple base stations (BSs).

In FIG. 1, the network and the communication devices are simply utilized for illustrating the structure of the wireless communication system 10. Practically, the network includes an evolved universal terrestrial radio access network (E-UTRAN) including at least one evolved Node-B (eNB) and a fifth generation (5G) network including at least one 5G BS (e.g., gNB) which employs orthogonal frequency-division multiplexing (OFDM) and/or non-OFDM and a transmission time interval (TTI) shorter than 1 ms (e.g., 1, 2, 3 or 4 OFDM symbols, 100 or 200 microseconds), to communicate with the communication devices.

A communication device may be a user equipment (UE), a mobile phone, a laptop, a tablet computer, an electronic book, a portable computer system, a vehicle, a ship or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
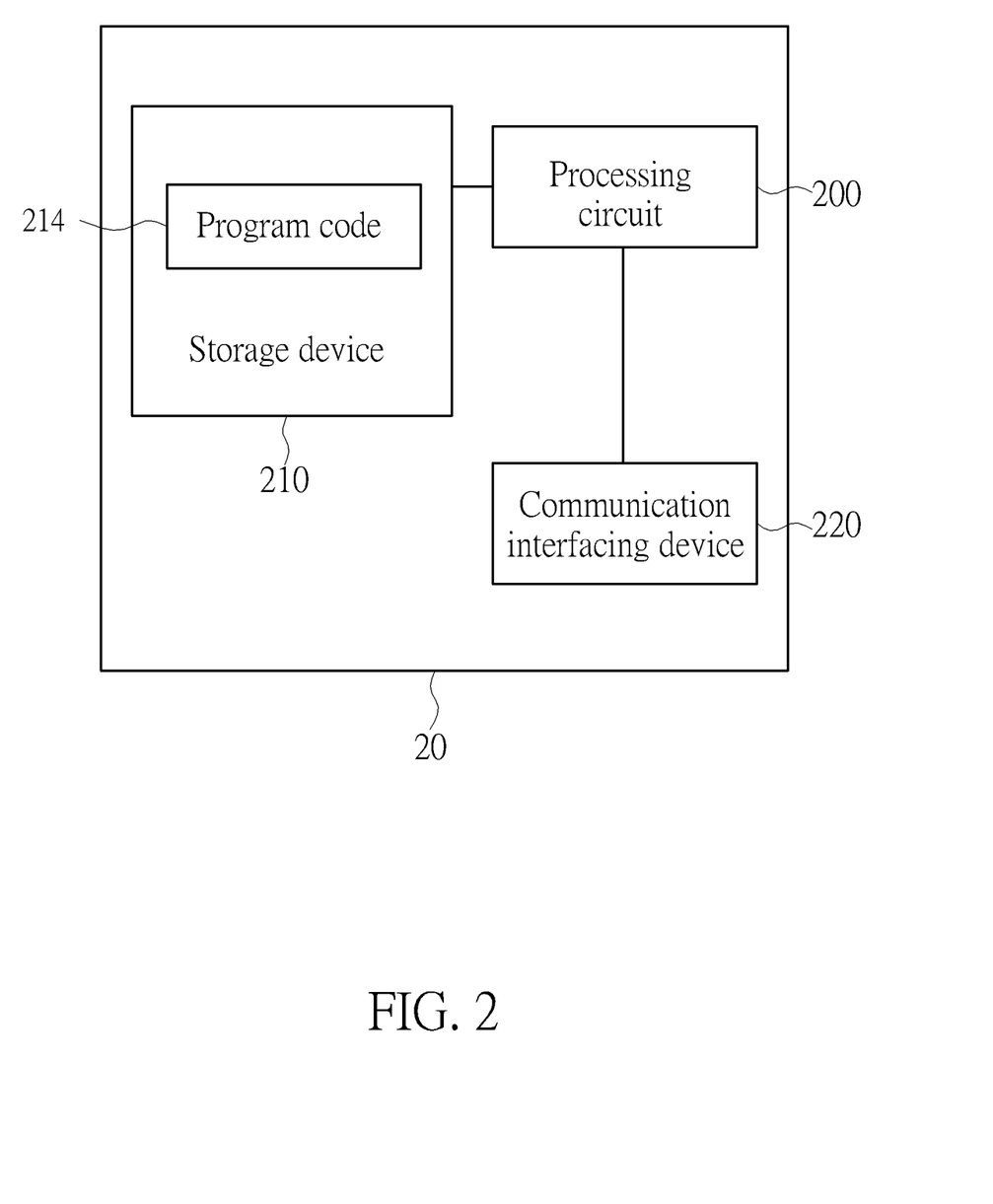
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein.

The communication device 20 may include a processing circuit 200 such as a microprocessor or Application Specific Integrated Circuit, a storage device 210 and a communication interfacing device 220. The storage device 210 maybe any data storage device that may store a program code 214, accessed and executed by the processing circuit 200. Examples of the storage device 210 include but are not limited to a subscriber identity module, read-only memory, flash memory, random-access memory, hard disk, optical data storage device, non-volatile storage device, non-transitory computer-readable medium (e.g., tangible media), etc. The communication interfacing device 220 includes at least one transceiver and is used to transmit and receive signals (e.g., data, messages and/or packets) according to processing results of the processing circuit 200.

A network slice is a complete logical network that comprises a set of network functions and corresponding resources to provide certain network capabilities and network characteristics. The network slice includes both a fifth generation Access Network (5G-AN) and a 5G Core Network (CN). A Network Slice Instance (NSI) is an instantiation of the network slice, i.e., a deployed set of network functions delivering intended Network Slice Services according to a Network Slice Template.

A UE may simultaneously be served by one or more NSIs via a 5G-AN. An access and mobility management function (AMF) instance serving the UE logically belongs to each of the NSIs serving the UE. That is, the AMF instance is common to the NSIs serving the UE.

A protocol data unit (PDU) session belongs to a specific NSI. Different NSIs may not share a PDU session, though different network slices may have slice-specific PDU sessions corresponding to the same data network name (DNN).

The UE may provide a configured Network Slice Selection Assistance information (NSSAI) in a radio resource control (RRC) Connection Establishment procedure and in a Non-Access Stratum (NAS). A radio access network (RAN) routes the initial access to an AMF according to the NSSAI. That is, the UE performs the RRC Connection Establishment procedure for the initial access. However, it is not clear how to route a non-initial access.

In the following examples, a UE is used to represent a communication device in FIG. 1, to simplify the illustration of the embodiments.

In the following examples, a RRC_INACTIVE state is used to represent a RRC_CONNECTED state with a light RRC connection in a LTE system or a RRC_INACTIVE state in a new radio (NR) (i.e., 5G) system.

Figure 3:
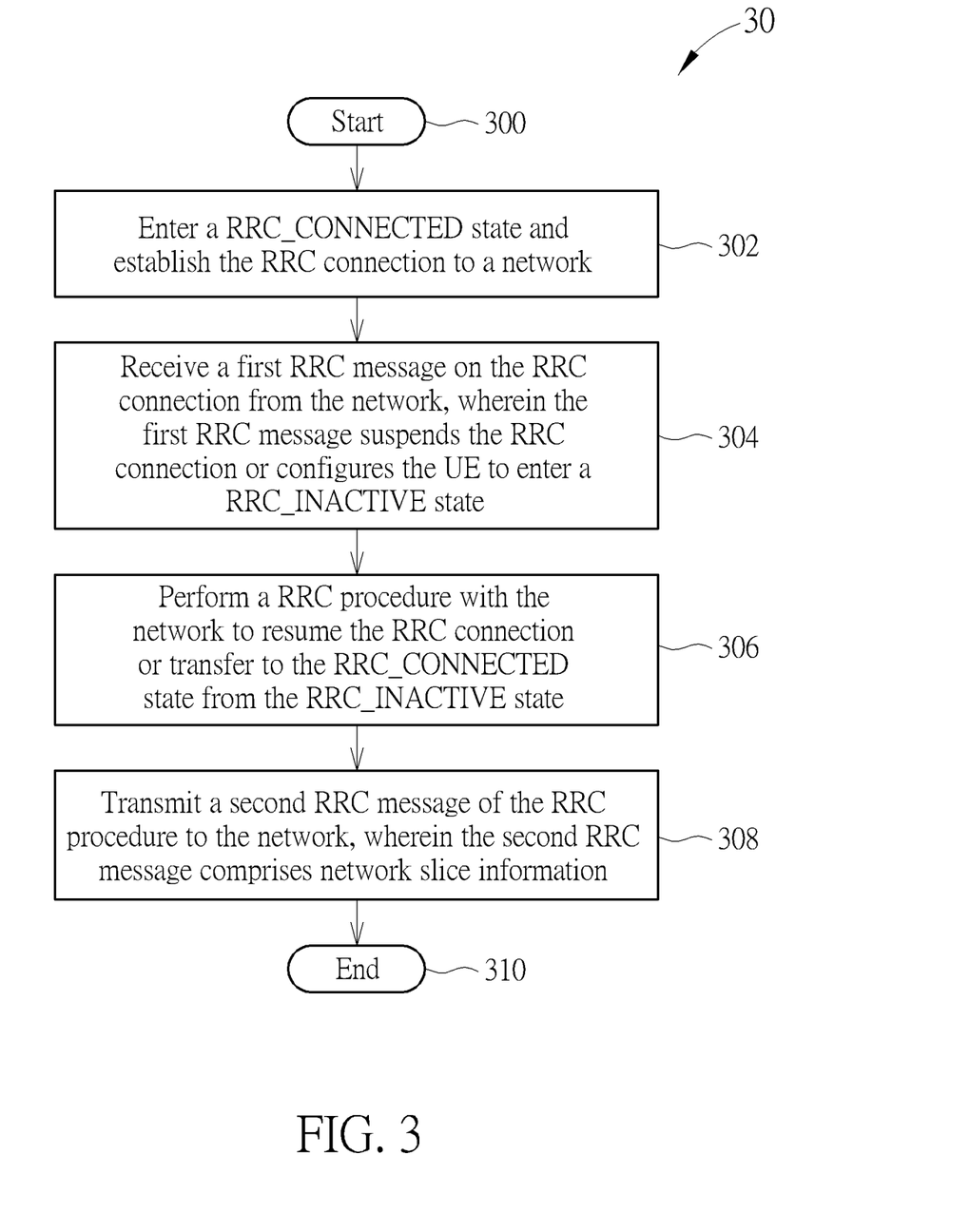
FIG. 3 is a flowchart of a process according to an example of the present invention.

A process 30 as shown in FIG. 3 is utilized in a UE shown in FIG. 1 and includes the following steps:

Step 300: Start.

Step 302: Enter a RRC_CONNECTED state and establish a RRC connection to a network.

Step 304: Receive a first RRC message on the RRC connection from the network, wherein the first RRC message suspends the RRC connection or configures the UE to enter a RRC_INACTIVE state.

Step 306: Perform a RRC procedure with the network to resume the RRC connection or transfer to the RRC_CONNECTED state from the RRC_INACTIVE state.

Step 308: Transmit a second RRC message of the RRC procedure to the network, wherein the second RRC message comprises network slice information.

Step 310: End.

The following examples may be applied to the process 30.

In one example, the UE receives a third RRC message from the network in response to the second RRC message. Then, the UE transmits a fourth RRC message to the network in response to the third RRC message. In one example, the RRC procedure is a RRC connection resume procedure. The second RRC message is a RRCConnectionResumeRequest message. The third RRC message is a RRCConnectionResume message. The fourth RRC message is a RRCConnectionResumeComplete message. For example, the UE receives the RRCConnectionResume message from the network in response to the RRCConnectionResumeRequest message. The UE transmits the RRCConnectionResumeComplete message to the network in response to the RRCConnectionResume message.

In one example, the RRC procedure is a RRC connection update procedure. The second RRC message is a RRCConnectionUpdateRequest message. The third RRC message is a RRCConnectionUpdate message. The fourth RRC message is a RRCConnectionUpdateComplete message. For example, the UE receives the RRCConnectionUpdate message from the network in response to the RRCConnectionUpdateRequest message. The UE transmits the RRCConnectionUpdateComplete message to the network in response to the RRCConnectionUpdate message.

In one example, the RRC procedure is a RRC inactive update procedure. The second RRC message is a RRCInactiveUpdateRequest message. The third RRC message is a RRCInactiveUpdate message. The fourth RRC message is a RRCInactiveUpdateComplete message. For example, the UE receives the RRCInactiveUpdate message from the network in response to the RRCInactiveUpdateRequest message. The UE transmits the RRCInactiveUpdateComplete message to the network in response to the RRCInactiveUpdate message.

In one example, the UE performs a RRC Connection Establishment procedure (i.e., an initial access) to enter the RRC_CONNECTED state. In the RRC Connection Establishment procedure, the UE transmits a RRCConnectionRequest message to the network. The UE receives a RRCConnectionSetup message configuring the RRC connection in response to the RRCConnectionRequest message, from the network. The UE transmits a RRCConnectionSetupComplete message including the network slice information in response to the RRCConnectionSetup message, to the network. When a BS of the network receives the RRCConnectionSetupComplete message, the BS selects an AMF of a plurality of AMFs according to the network slice information, to connect to the UE. That is, the BS routes a NAS message received from the UE, to the AMF.

In one example, the network slice information includes (or simply is) a Network Slice Selection Assistance information (NSSAI) or a Single NSSAI (S-NSSAI). In one example, the network slice information is derived by the UE according to the NSSAI or the S-NSSAI.

Figure 4:
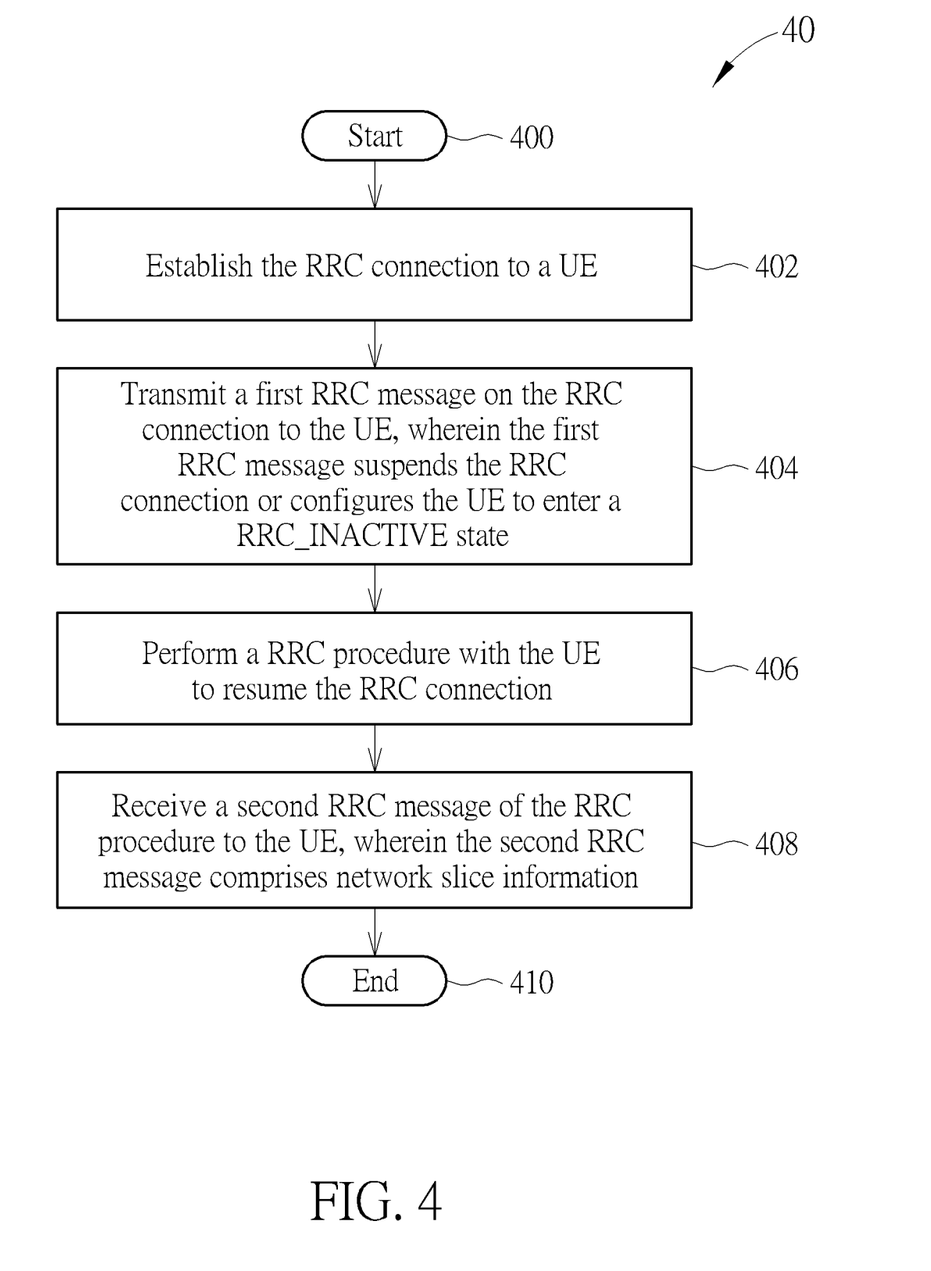
FIG. 4 is a flowchart of a process according to an example of the present invention.

A process 40 as shown in FIG. 4 is utilized in a network shown in FIG. 1 and includes the following steps:

Step 400: Start.

Step 402: Establish a RRC connection to a UE.

Step 404: Transmit a first RRC message on the RRC connection to the UE, wherein the first RRC message suspends the RRC connection or configures the UE to enter a RRC_INACTIVE state.

Step 406: Perform a RRC procedure with the UE to resume the RRC connection.

Step 408: Receive a second RRC message of the RRC procedure from the UE, wherein the second RRC message comprises network slice information.

Step 410: End.

The examples of the processes 30 may be applied to the process 40, and are not narrated herein. The following examples may be applied to the processes 30 and 40.

In one example, the UE in a suspended state (i.e., the RRC connection is suspended) may transmit a RRC message to resume the RRC connection for the non-initial access. The UE in the RRC_INACTIVE state may initiate the RRC procedure by transmitting a RRC message requesting to enter the RRC_CONNECTED state. When a BS of the network receives the network slice information in the fourth RRC message, the BS selects an AMF of a plurality of AMFs according to the network slice information, to connect to the UE. That is, the BS routes a NAS message received from the UE to the AMF, when resuming the RRC connection or configuring the UE to enter the RRC_CONNECTED state.

Figure 5:
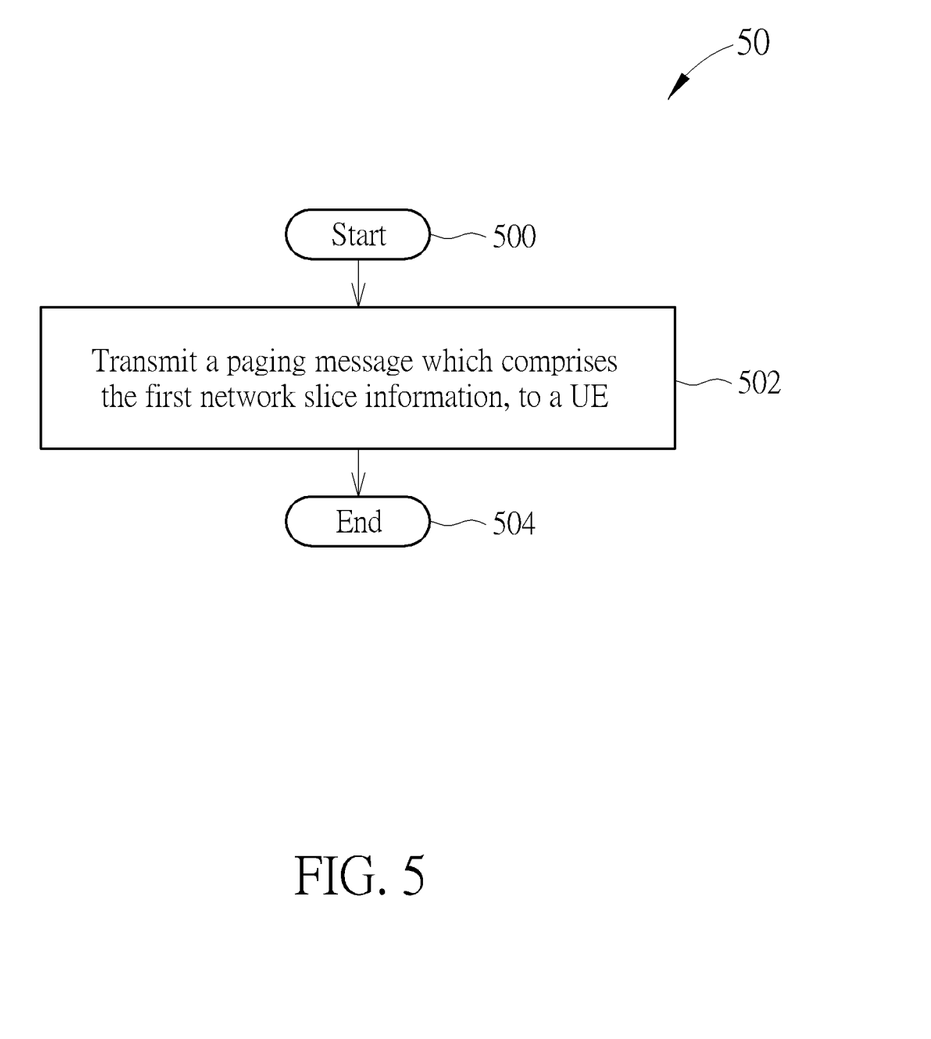
FIG. 5 is a flowchart of a process according to an example of the present invention.

A process 50 as shown in FIG. 5 is utilized in a network shown in FIG. 1 and includes the following steps:

Step 500: Start.

Step 502: Transmit a paging message which comprises the first network slice information, to a UE.

Step 504: End.

The following examples may be applied to the process 50.

In one example, the paging message includes an identity of the UE to address the UE. In one example, the UE determines to address to itself according to the identity of the UE in the paging message, when the UE receives the paging message.

In one example, the UE determines or derives second network slice information (e.g., S-NSSAI) or PDU Session information (e.g., PDU Session ID) according to the first network slice information (e.g., NSSAI). The UE transmits a NAS message or a RRC message to the network in response to the paging message. The UE includes the second network slice information or the PDU Session information in the NAS message or the RRC message.

In one example, the UE determines a value of a RRC information element (e.g., an establishment cause value) according to the first network slice information.

Figure 6:
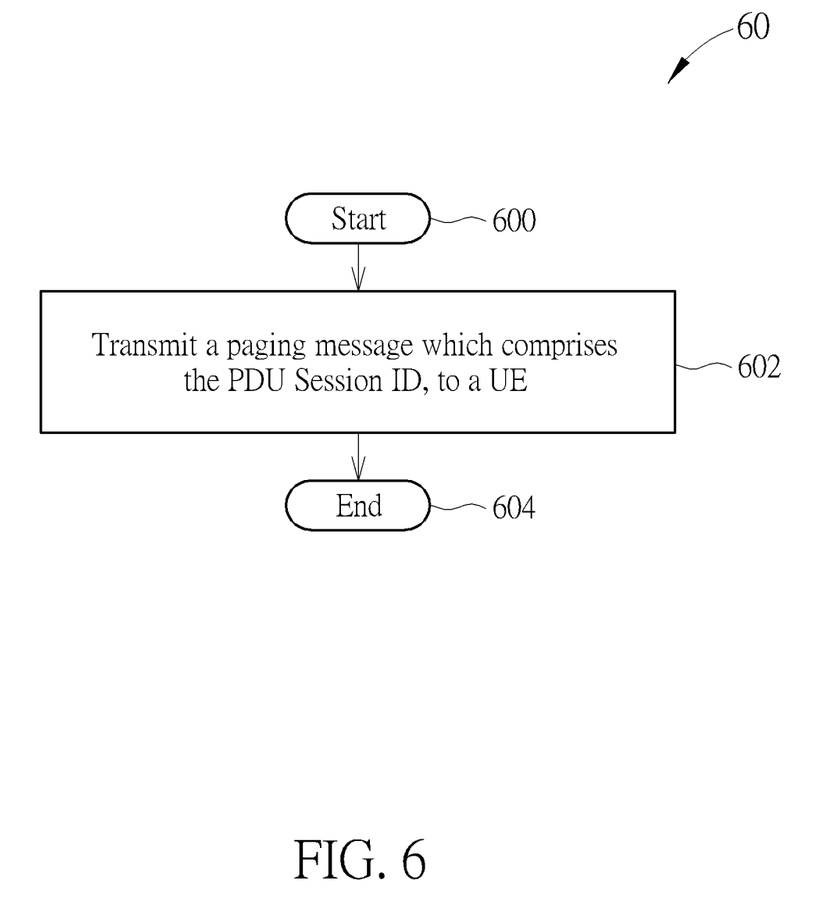
FIG. 6 is a flowchart of a process according to an example of the present invention.

A process 60 as shown in FIG. 6 is utilized in a network shown in FIG. 1 and includes the following steps:

Step 600: Start.

Step 602: Transmit a paging message which comprises the PDU Session ID, to a UE.

Step 604: End.

The following examples may be applied to the process 60.

In one example, the paging message includes an identity of the UE to address the UE. In one example, the UE determines to address to itself according to the identity of the UE in the paging message, when the UE receives the paging message.

In one example, the UE transmits a NAS message or a RRC message to the network in response to the paging message. The UE includes the PDU Session ID in the NAS message or the RRC message.

In one example, the UE determines or derives network slice information according to the PDU Session ID. The UE transmits a NAS message or a RRC message to the network in response to the paging message. The UE includes the network slice information in the NAS message or the RRC message.

In one example, the UE determines a value of a RRC information element (e.g., an establishment cause value) according to the PDU Session ID.

In one example, the network slice information includes (or simply is) a NSSAI or a S-NSSAI. In one example, the network slice information is derived by the UE according to the NSSAI or the S-NSSAI.

Figure 7:
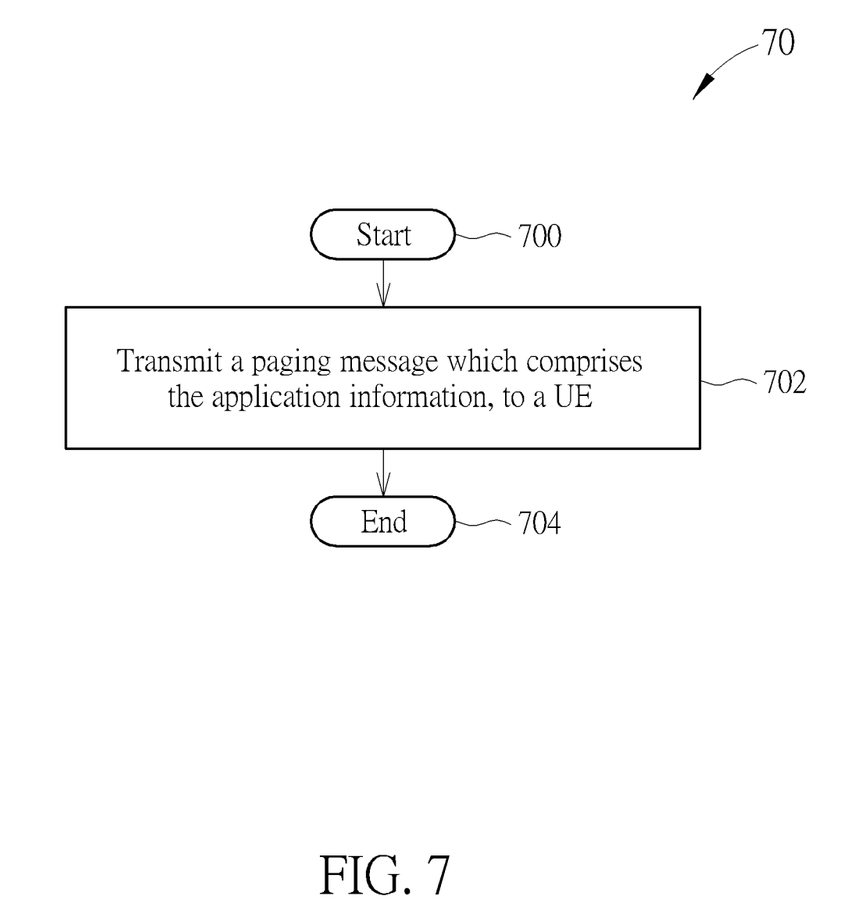
FIG. 7 is a flowchart of a process according to an example of the present invention.

A process 70 as shown in FIG. 7 is utilized in a network shown in FIG. 1, to handle application information. The process 70 includes the following steps:

Step 700: Start.

Step 702: Transmit a paging message which comprises the application information, to a UE.

Step 704: End.

The following examples may be applied to the process 70.

In one example, the paging message includes an identity of the UE to address the UE. In one example, the UE determines to address to itself according to the identity of the UE in the paging message, when the UE receives the paging message.

In one example, the UE determines or derives network slice information (e.g., S-NSSAI) or PDU Session information (e.g., PDU Session ID) according to the application information (e.g., an application identity/identifier, an enumerated value or an IP Multimedia Subsystem (IMS)). The UE transmits a NAS message or a RRC message to the network in response to the paging message. The UE includes the network slice information or the PDU Session information in the NAS message or the RRC message.

In one example, the UE determines a value of a RRC information element (e.g., an establishment cause value) according to the application information.

The following examples may be applied to the processes 50-70.

In one example, the NAS message is a Service Request message. In one example, the RRC message is a RRCConnectionRequest message, a RRCConnectionSetupComplete message, a RRCConnectionResumeRequest message, a RRCConnectionResumeComplete message, a RRCConnectionUpdateRequest message, a RRCConnectionUpdateComplete message, a RRCInactiveUpdateRequest message or a RRCInactiveUpdateComplete message.

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program code 214.

To sum up, the present invention provides a method and a communication device for handling network slice information. The network slice information is transmitted in a message such as a RRC message or a paging message. Thus, the problem of handling the network slice information is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling network slice information, comprising:
   a storage device; and a processing circuit, coupled to the storage device, wherein the storage device stores, and the processing circuit is configured to execute instructions of:
entering a RRC_CONNECTED state and establishing a radio resource control (RRC) connection to a network;
transmitting a RRCConnectionSetupComplete message comprising the network slice information to the network;
receiving a first RRC message on the RRC connection from the network, wherein the first RRC message suspends the RRC connection or configures the communication device to enter a RRC_INACTIVE state;
performing a RRC connection resume procedure with the network to resume the RRC connection or transferring to the RRC_CONNECTED state from the RRC_INACTIVE state; and
transmitting a second RRC message of the RRC connection resume procedure to the network, wherein the second RRC message comprises the network slice information.

2. The communication device of claim 1, wherein the instructions further comprise:
receiving a third RRC message in response to the second RRC message from the network.

3. The communication device of claim 1, wherein the network slice information comprises a Network Slice Selection Assistance information (NSSAI) or a Single NSSAI (S-NSSAI).

4. The communication device of claim 1, wherein the network slice information is derived by the communication device according to a NSSAI or a S-NSSAI.

5. A network for handling network slice information, comprising:
a storage device; and
a processing circuit, coupled to the storage device, wherein the storage device stores, and the processing circuit is configured to execute instructions of:
establishing a radio resource control (RRC) connection to a communication device;
receiving a RRCConnectionSetupComplete message comprising the network slice information from the communication device;
transmitting a first RRC message on the RRC connection to the communication device, wherein the first RRC message suspends the RRC connection or configures the communication device to enter a RRC_INACTIVE state;
performing a RRC connection resume procedure with the communication device to transfer the communication device to a RRC_CONNECTED state from the RRC_INACTIVE state; and
receiving a second RRC message of the RRC connection resume procedure from the communication device, wherein the second RRC message comprises the network slice information.

6. The network of claim 5, wherein the instructions further comprise:
transmitting a third RRC message in response to the second RRC message to the communication device.

7. The network of claim 5, wherein the network slice information comprises a Network Slice Selection Assistance information (NSSAI) or a Single-NSSAI (S-NSSAI).

8. The network of claim 5, wherein the network slice information is derived by the communication device according to a NSSAI or a S-NSSAI.

9. A method for handling network slice information of a communication device, comprising:
entering a RRC_CONNECTED state and establishing a radio resource control (RRC) connection to a network;
transmitting a RRCConnectionSetupComplete message comprising the network slice information to the network;
receiving a first RRC message on the RRC connection from the network, wherein the first RRC message suspends the RRC connection or configures the communication device to enter a RRC_INACTIVE state;
performing a RRC connection resume procedure with the network to resume the RRC connection or transferring to the RRC_CONNECTED state from the RRC_INACTIVE state; and
transmitting a second RRC message of the RRC connection resume procedure to the network, wherein the second RRC message comprises the network slice information.

10. The method of claim 9, further comprising:
receiving a third RRC message in response to the second RRC message from the network.

11. The method of claim 9, wherein the network slice information comprises a Network Slice Selection Assistance information (NSSAI) or a Single NSSAI (S-NSSAI).

12. The method of claim 9, wherein the network slice information is derived by the communication device according to a NSSAI or a S-NSSAI.

* * * * *